United States Patent
Ando

(10) Patent No.: US 11,095,780 B2
(45) Date of Patent: Aug. 17, 2021

(54) INFORMATION PROCESSING APPARATUS FOR AUTOMATICALLY DETERMINING A TRANSMISSION DESTINATION OF IMAGE DATA

(71) Applicant: Ricoh Company, Ltd., Tokyo (JP)

(72) Inventor: Mitsuo Ando, Fukuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/681,939

(22) Filed: Nov. 13, 2019

(65) Prior Publication Data

US 2020/0177743 A1  Jun. 4, 2020

(30) Foreign Application Priority Data

Nov. 29, 2018 (JP) .............................. JP2018-223482

(51) Int. Cl.
*H04N 1/00* (2006.01)
*H04N 1/32* (2006.01)

(52) U.S. Cl.
CPC ..... *H04N 1/00228* (2013.01); *H04N 1/32096* (2013.01); *H04N 1/32101* (2013.01); *H04N 1/32507* (2013.01)

(58) Field of Classification Search
CPC ....................... H04N 1/00228; H04N 1/32096
See application file for complete search history.

(56) References Cited

U.S. PATENT DOCUMENTS

| 8,738,791 | B1 * | 5/2014 | Martini | ................... | H04L 67/18 709/229 |
|---|---|---|---|---|---|
| 2004/0075857 | A1 | 4/2004 | Akiyoshi et al. | | |
| 2004/0218208 | A1 | 11/2004 | Akiyoshi et al. | | |
| 2004/0255263 | A1 | 12/2004 | Ando | | |
| 2006/0070087 | A1 | 3/2006 | Ando et al. | | |
| 2007/0047017 | A1 | 3/2007 | Ando et al. | | |
| 2007/0124510 | A1 | 5/2007 | Ando | | |
| 2008/0005029 | A1 | 1/2008 | Ando | | |
| 2008/0066084 | A1 | 3/2008 | Akiyoshi et al. | | |
| 2008/0098389 | A1 | 4/2008 | Akiyoshi et al. | | |
| 2008/0158597 | A1 * | 7/2008 | Hashimoto | ........... | G06F 3/1204 358/1.15 |

(Continued)

FOREIGN PATENT DOCUMENTS

JP 2014-149633 8/2014

*Primary Examiner* — Benjamin O Dulaney
(74) *Attorney, Agent, or Firm* — Xsensus LLP

(57) ABSTRACT

An information processing apparatus, communicable with an intermediary apparatus communicable with a target apparatus, includes circuitry configured to receive, from a terminal device communicable with the information processing apparatus, identification information acquired by the terminal device from an external source, receive, from the terminal device, image data input at the terminal device, identify a transmission destination of the received image data, related to a service operation associated with the identification information and to be output from the target apparatus via the intermediary apparatus, based on address information of a transmission source that has transmitted the identification information to the information processing apparatus, and transmit information indicating the transmission destination of the image data to the terminal device.

14 Claims, 13 Drawing Sheets

(56) References Cited

U.S. PATENT DOCUMENTS

| | | |
|---|---|---|
| 2009/0019440 A1 | 1/2009 | Ando |
| 2009/0276826 A1 | 11/2009 | Ando |
| 2010/0309502 A1 | 12/2010 | Ando et al. |
| 2013/0073719 A1 | 3/2013 | Ando |
| 2013/0114095 A1 | 5/2013 | Akiyoshi et al. |
| 2013/0185605 A1 | 7/2013 | Ando et al. |
| 2013/0242331 A1 | 9/2013 | Ando |
| 2013/0258407 A1 | 10/2013 | Akiyoshi et al. |
| 2013/0308161 A1 | 11/2013 | Ando et al. |
| 2014/0016165 A1 | 1/2014 | Ando |
| 2015/0070725 A1* | 3/2015 | Monden ................ G06F 3/1232 358/1.15 |
| 2015/0116746 A1* | 4/2015 | Park ...................... G06F 3/1292 358/1.13 |
| 2015/0186188 A1 | 7/2015 | Ando |
| 2015/0222563 A1* | 8/2015 | Burns .................... G06F 3/122 709/226 |
| 2015/0264200 A1 | 9/2015 | Ando |
| 2015/0281332 A1 | 10/2015 | Naito et al. |
| 2015/0373123 A1* | 12/2015 | Warrick ................. H04L 67/32 709/228 |
| 2016/0065759 A1* | 3/2016 | Sakaguchi ............ G06F 3/1236 358/1.15 |
| 2016/0119506 A1 | 4/2016 | Namihira et al. |
| 2016/0342577 A1 | 11/2016 | Ando |
| 2017/0102865 A1 | 4/2017 | Ando |
| 2017/0272601 A1 | 9/2017 | Ando |
| 2017/0339232 A1 | 11/2017 | Ando |
| 2018/0084121 A1 | 3/2018 | Ando |
| 2018/0121470 A1* | 5/2018 | Grossman ........... G06F 16/5866 |
| 2018/0176417 A1 | 6/2018 | Ando |
| 2020/0084291 A1* | 3/2020 | Ando ................ H04N 1/00185 |
| 2020/0106900 A1* | 4/2020 | Ando ................ H04N 1/00148 |

* cited by examiner

FIG. 8

| TENANT ID | COMMUNICATION ID | ADDRESS INFORMATION | STATE INFORMATION | BROWSER ID | BROWSER STATE | DISTRIBUTION SOURCE ADDRESS INFORMATION /122 |
|---|---|---|---|---|---|---|
| T001 | Eg001-01 | 10.56.60.xx | CONNECTED | BROWSER1 | POWER OFF | /Delivery |
|  | Eg001-02 | 192.168.0.xx | NOT CONNECTED | BROWSER2 | POWER SAVING |  |
|  |  |  |  | BROWSER3 | POWER OFF |  |
|  | .. | .. | .. | .. | .. |  |
| T002 | .. | .. | .. | .. | .. | .. |

FIG. 9

| REGISTRATION ID | IN-APPLICATION ID | OUT-APPLICATION ID | BROWSER ID |
|---|---|---|---|
| Tag01 | AP_Upload | AP_PhotoShow | BROWSER1 |
| ⋮ | ⋮ | ⋮ | ⋮ |

| APPLICATION ID | APPLICATION TYPE | URL |
|---|---|---|
| AP_PhotoShow | Out | https://daas.com/photoshow |
| AP_Upload | In | https://daas.com/upload |

~121

| TENANT ID | USER ID | ··· ~123 |
|---|---|---|
| T001 | gest | ··· |
| | taro | ··· |
| | ··· | ··· |
| : | : | : |

INFORMATION PROCESSING APPARATUS FOR AUTOMATICALLY DETERMINING A TRANSMISSION DESTINATION OF IMAGE DATA

CROSS-REFERENCE TO RELATED APPLICATION

This application claims priority pursuant to 35 U.S.C. § 119(a) to Japanese Patent Application No. 2018-223482 filed on Nov. 29, 2018 in the Japan Patent Office, the disclosure of which are incorporated by reference herein in their entirety.

BACKGROUND

Technical Field

This disclosure relates to an information processing apparatus, an information processing system, and a method of processing information.

Background Art

Conventional technologies disclose one technique, in which a user terminal acquires an apparatus identification (ID) and a service ID from a signage device, and then the user terminal transmits the apparatus ID and the service ID to a server, the server identifies a workflow based on a combination of the apparatus ID and the service ID received from the user terminal, and then performs the identified workflow. For example, the server can be configured to perform a workflow such as transmitting synthesized images to the signage device.

SUMMARY

As one aspect of the present disclosure, an information processing apparatus, communicable with an intermediary apparatus communicable with a target apparatus, is devised. The information processing apparatus includes circuitry configured to receive, from a terminal device communicable with the information processing apparatus, identification information acquired by the terminal device from an external source, receive, from the terminal device, image data input at the terminal device, identify a transmission destination of the received image data, related to a service operation associated with the identification information and to be output from the target apparatus via the intermediary apparatus, based on address information of a transmission source that has transmitted the identification information to the information processing apparatus, and transmit information indicating the transmission destination of the image data to the terminal device.

As another aspect of the present disclosure, an information processing system is devised. The information processing system includes an intermediary apparatus communicable with a target apparatus, and an information processing apparatus communicable with the intermediary apparatus. The information processing apparatus includes first circuitry configured to receive, from a terminal device communicable with the information processing apparatus, identification information acquired by the terminal device from an external source, receive, from the terminal device, image data input at the terminal device, identify a transmission destination of the received image data, related to a service operation associated with the identification information and to be output from the target apparatus via the intermediary apparatus, based on address information of a transmission source that has transmitted the identification information to the information processing apparatus, and transmit information indicating the transmission destination of the image data to the terminal device. The intermediary apparatus includes second circuitry configured to instruct the target apparatus to output the image data, received from the terminal device via the information processing apparatus based on the information indicating the transmission destination.

As another aspect of the present disclosure, a method of processing information using an intermediary apparatus communicable with a target apparatus, and an information processing apparatus communicable with the intermediary apparatus is devised. The method includes receiving, from a terminal device communicable with the information processing apparatus, identification information acquired by the terminal device from an external source, receiving, from the terminal device, image data input at the terminal device, identifying a transmission destination of the received image data, related to a service operation associated with the identification information and to be output from the target apparatus via the intermediary apparatus, based on address information of a transmission source that has transmitted the identification information to the information processing apparatus, and transmitting information indicating the transmission destination of the image data to the terminal device.

BRIEF DESCRIPTION OF THE DRAWINGS

A more complete appreciation of the description and many of the attendant advantages and features thereof can be readily acquired and understood from the following detailed description with reference to the accompanying drawings, wherein:

FIG. 8 is an example of information stored in an apparatus information storage unit;

FIG. 9 is an example of information stored in a registration information storage unit;

FIG. 10 is an example of information stored in an application information storage unit;

DETAILED DESCRIPTION

A description is now given of exemplary embodiments of the present disclosure. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present disclosure.

In addition, it should be noted that the terminology used herein is for the purpose of describing particular embodiments only and is not intended to be limiting of the present disclosure. Thus, for example, as used herein, the singular forms "a", "an" and "the" are intended to include the plural forms as well, unless the context clearly indicates otherwise. Moreover, the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Figure 1:
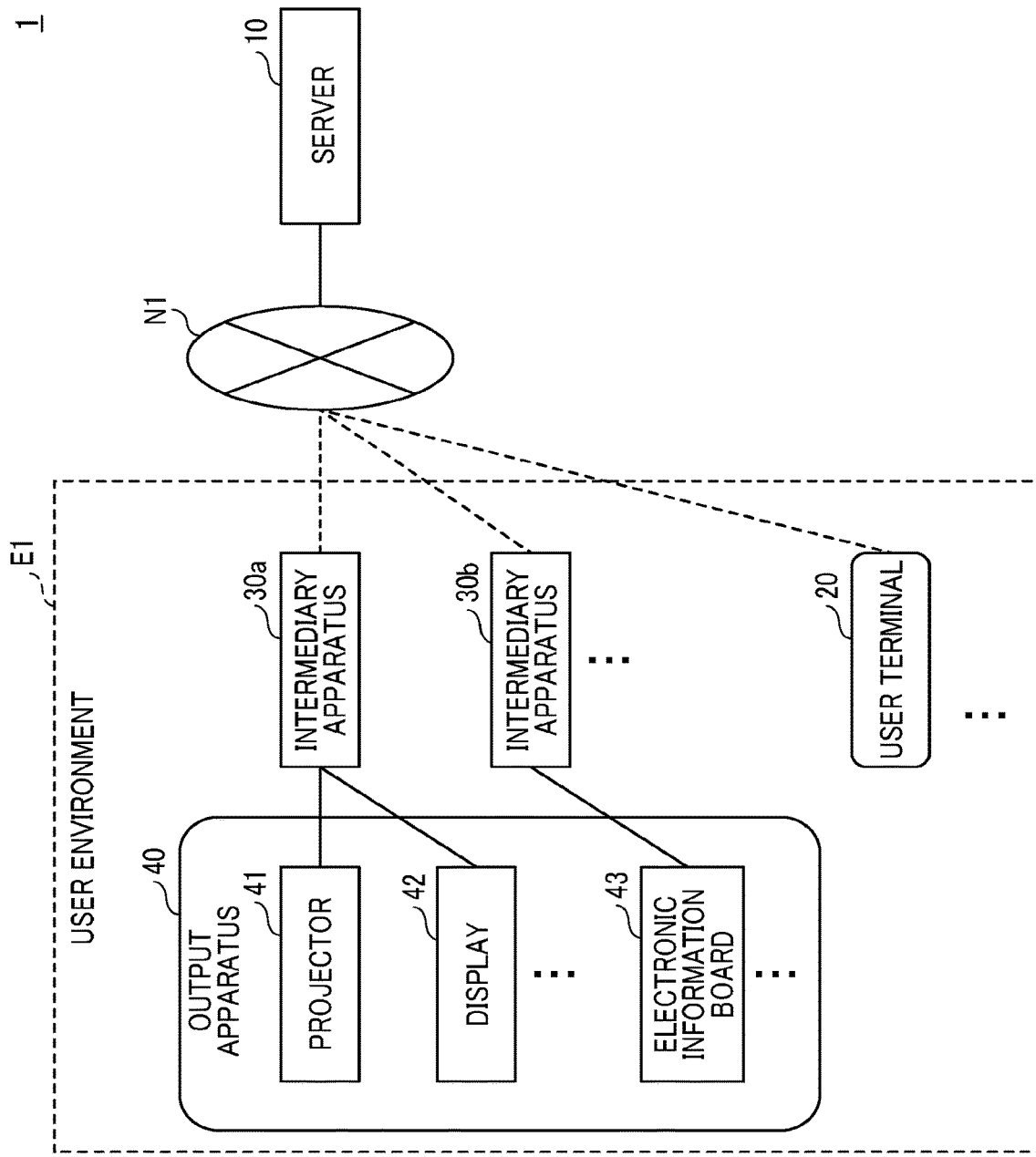
FIG. 1 is an example system configuration of an information processing system according to a first embodiment.

Hereinafter, a description is given of an information processing system 1 of a first embodiment with reference to FIG. 1. FIG. 1 is an example system configuration of the information processing system 1 according to the first embodiment. The information processing system 1 includes, for example, a server 10, and a user environment E1 including one or more apparatuses, such as one or more user terminals 20, one or more intermediary apparatuses 30, and one or more output apparatuses 40. In the information processing system 1 of FIG. 1, the server 10 and the user environment E1 can communicate with each other via a network N1, such as a wide area network using the Internet. The network N1 can be any network that can be accessed within a pre-set range, such as an Intranet.

The user environment E1 indicates a system environment of an entity, such as a company, having one or more output apparatuses, such as one or more output apparatuses 40, and one or more intermediary apparatuses 30, such as intermediary apparatuses 30a and 30b. The output apparatus 40 is an apparatus that outputs an image input to the output apparatus 40.

As indicated in FIG. 1, the output apparatus 40 can be, for example, a projector 41, a display 42, and an electronic information board 43. In the user environment E1, each of the output apparatuses 40 is connected to each of the intermediary apparatuses 30 corresponding to each of the output apparatuses 40. In FIG. 1, the projector 41 and the display 42 are connected to the intermediary apparatus 30a, and the electronic information board 43 is connected to the intermediary apparatus 30b. That is, one or more output apparatuses 40 can be connected to one intermediary apparatus 30.

Although FIG. 1 indicates an example case that different types of output apparatuses 40 such as the projector 41 and the display 42 are connected to the intermediary apparatus 30a, the same kind of the output apparatuses 40 can be connected to the one intermediary apparatuses 30. The output apparatus 40 and the intermediary apparatus 30 can be connected via an interface compatible to a standard interface of image transmission, such as high definition multimedia interface (HDMI: registered trademark). For example, the output apparatus 40 and the intermediary apparatus 30 can be connected using a cable, such as an HDMI (registered trademark) cable, corresponding to the standard interface of image transmission. Alternatively, a connector of the intermediary apparatus 30 compatible to the standard interface and a connector of the output apparatus 40 compatible to the standard interface can be connected directly. For example, when the connector of the intermediary apparatus 30 is inserted into the connector of the output apparatus 40, the intermediary apparatus 30 and the output apparatus 40 can be connected. Alternatively, the intermediary apparatus 30 and the output apparatus 40 can be connected using wireless communication, or connected via a network.

By connecting the output apparatus 40 and the intermediary apparatus 30 as described above, the intermediary apparatus 30 can transmit to-be-output image to the output apparatus 40.

The intermediary apparatus 30 is connected to the network N1 via a local area network (LAN) set in the user environment E1. The intermediary apparatus 30 can be wirelessly connected to the network, such as LAN, set in the user environment E1. The intermediary apparatus 30, installed with a web browser, executes the web browser to perform various processing in response to receiving an execution request of processing for image data, transmitted from the server 10, and controls the output apparatus (target apparatus), such as the output apparatus 40, in which the processing result is output using the output apparatus 40. Specifically, in the first embodiment, the intermediary apparatus 30 causes the output apparatus 40 to perform outputting the image data, such as projection of the image data. That is, the intermediary apparatus 30 mediates the output (e.g., projection) of image data using the output apparatus 40 for the image data transmitted from the server 10. For example, a computer, such as an HDMI (registered trademark) dongle, a stick PC or the like can be used as the intermediary apparatus 30.

The user terminal 20 is an information processing terminal to be carried by each user in the user environment E1. For example, a smartphone, a tablet device, a PC, or a cellular phone can be used as the user terminal 20. The user terminal 20 can be connected to the network N1, for example, via a mobile communication network without using the LAN provided in the user environment E1. However, the user terminal 20 can be also connected to the network provided in the user environment E1. In this description, the user terminal 20 is described as an example of terminal device. In this description, the user terminal 20 can be used as a terminal device for acquiring or capturing various types of information, such as image, text, code, signal or the like, associated with the target apparatus (e.g., output apparatus 40).

The server 10 is one or more computers that execute processing for implementing output of image data designated at the user terminal 20, using the output apparatus, such as the output apparatus 40 based on a simple operation using the user terminal 20. Further, the server 10 can be disposed in the user environment E1. The server 10 is described as an example of the information processing apparatus.

Figure 2:
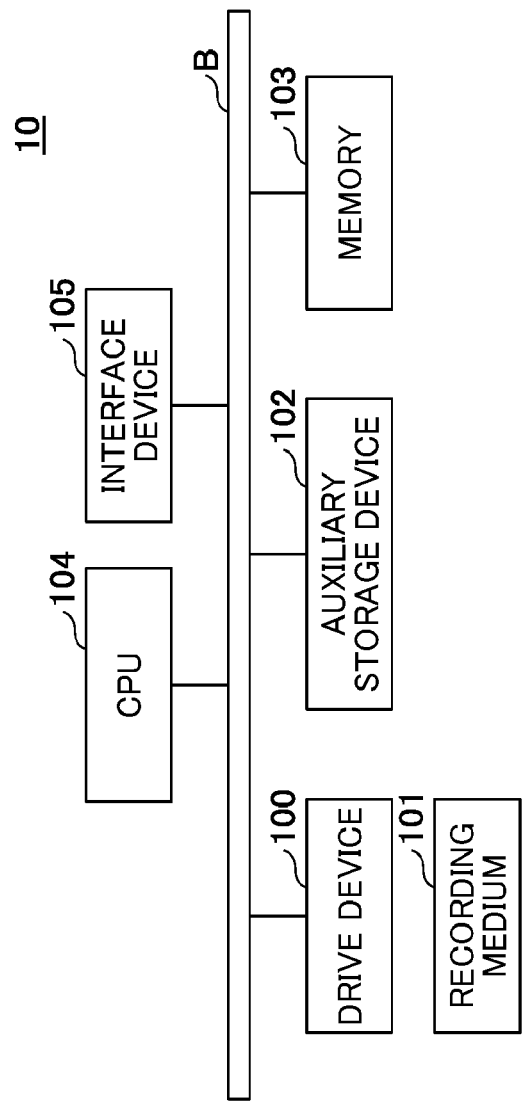
FIG. 2 is an example block diagram of a hardware configuration of a server according to the first embodiment.

FIG. 2 is an example block diagram of a hardware configuration of the server 10 according to the first embodiment. As indicated in FIG. 2, the server 10 includes, for example, a drive device 100, an auxiliary storage device 102, a memory 103, a central processing unit (CPU) 104, and an interface device 105, which are connected to each other via a bus B.

One or more programs for implementing various processing in the server 10 can be provided from a recording medium 101 such as a compact disc read-only memory (CD-ROM). Hereinafter, the program may mean one or more programs. When the recording medium 101 storing the program is set to the drive device 100, the program is installed in the auxiliary storage device 102 via the drive device 100 from the recording medium 101. However, the program installation is not necessarily need to be carried out via the recording medium 101, but the program can instead be downloaded from another computer via a network. The auxiliary storage device 102 stores the installed program and necessary files and data.

The memory 103 reads the program from the auxiliary storage device 102 and stores the program when the program is instructed to be activated. The CPU 104 executes the program stored in the memory 103 to implement functions of the server 10. The interface device 105 is used as an interface for connecting to the network.

Figure 3:
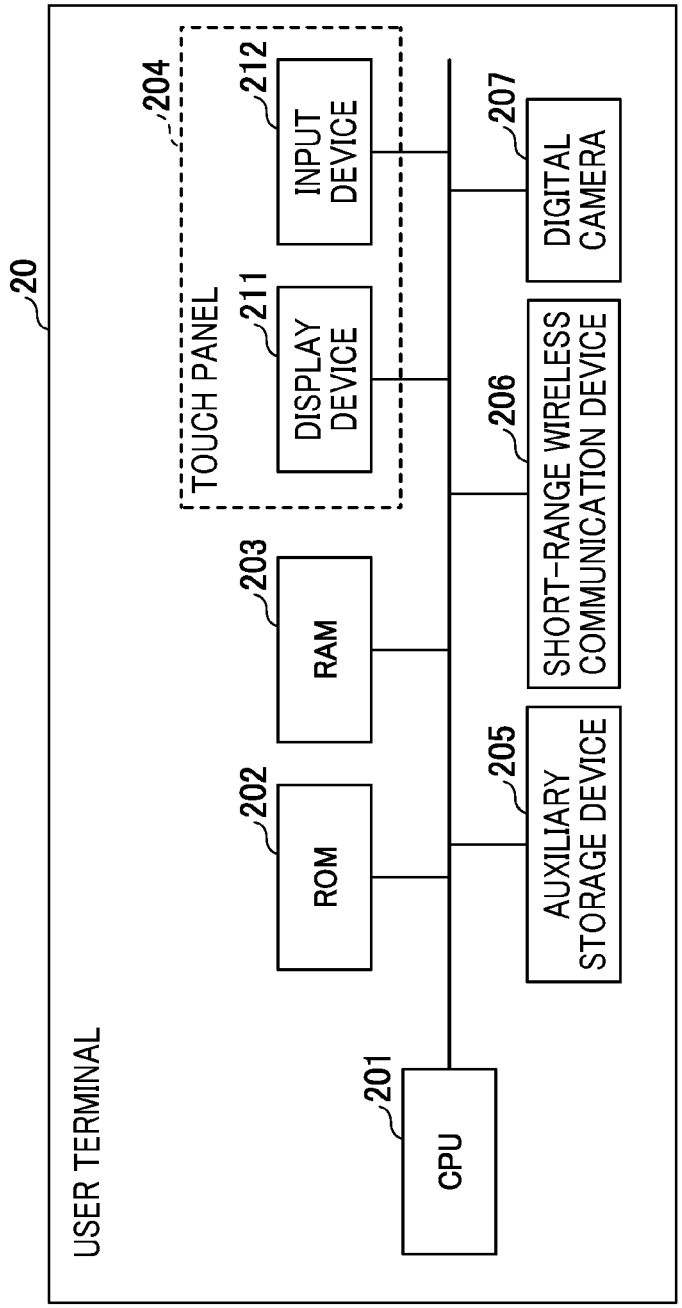
FIG. 3 is an example block diagram of a hardware configuration of a user terminal according to the first embodiment.

FIG. 3 is an example block diagram of a hardware configuration of the user terminal 20 according to the first embodiment. As indicated in FIG. 3, the user terminal 20 includes, for example, a CPU 201, a read-only memory (ROM) 202, a random access memory (RANI) 203, a touch panel 204, an auxiliary storage device 205, a short-range wireless communication device 206, and a digital camera 207.

The ROM 202 and the auxiliary storage device 205 store the program installed on the user terminal 20. When the program is instructed to be activated, the RAM 203 reads the program from the ROM 202 or the auxiliary storage device 205 and stores the program. The CPU 201 executes the program stored in the RAM 203 to implement functions of the user terminal 20.

The touch panel 204 is an electronic component equipped with both an input function and a display function, and performs information display, and a reception of input from a user. As indicated in FIG. 3, the touch panel 204 includes, for example, a display device 211, and an input device 212.

The display device 211 is, for example, a liquid crystal display, and performs a display function of the touch panel 204. The input device 212 is an electronic component including a sensor that can detect a contact of an object contacting the display device 211. The object means an object that contacts a contact surface (face) of the touch panel 204. Examples of the object include a user finger, a special pen, or a general pen. The touch panel 204 is not necessarily need to be provided. The user terminal 20 may be provided with the display device 211 and the input device 212 separately. Further, the display device 211 can be connected to the user terminal 20 externally. Further, the input device 212 is not limited to a sensor for detecting the contact. For example, the input device 212 includes electronic components, such as hardware keys, a keyboard, a mouse, and the like.

The short-range wireless communication device 206 is a hardware resource used for performing short-range wireless communication. In the first embodiment, the short-range wireless communication device 206 reads information stored in a near field communication (NFC) tag. That is, in the first embodiment, an NFC reader can be used as the short-range wireless communication device 206. The digital camera 207 can be a general digital camera having an imaging function. The digital camera 207 can be disposed as an electronic component inside the user terminal 20, or the digital camera 207 can be connected to the user terminal 20 externally.

Figure 4:
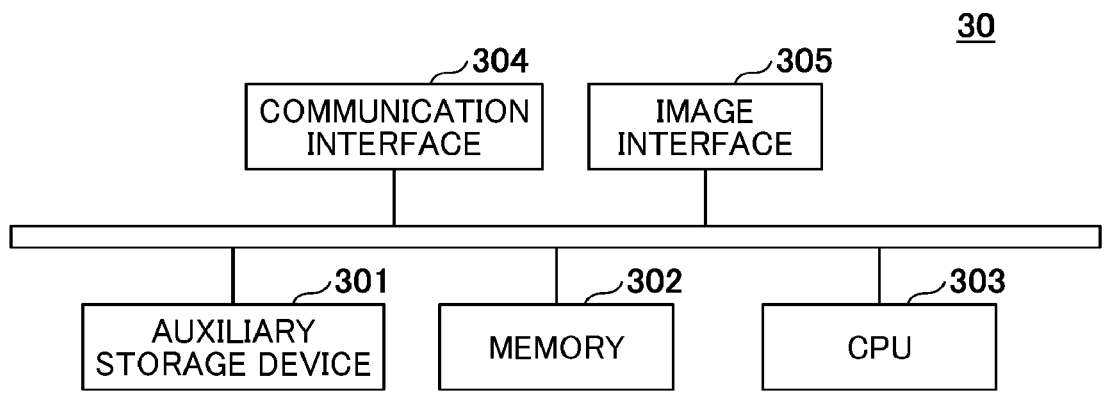
FIG. 4 is an example block diagram of a hardware configuration of an intermediary apparatus according to the first embodiment.

FIG. 4 is an example block diagram of a hardware configuration of the intermediary apparatus 30 according to the first embodiment. As indicated in FIG. 4, the intermediary apparatus 30 includes, for example, an auxiliary storage device 301, a memory 302, a CPU 303, a communication interface 304, and an image interface 305.

One or more programs for implementing various processing in the intermediary apparatus 30 is installed in the auxiliary storage device 301. Hereinafter, the program may mean one or more programs. The auxiliary storage device 301 stores the installed program, and necessary files and data.

The memory 302 reads the program from the auxiliary storage device 301 and stores the program when the program is instructed to activate. The CPU 303 executes the program stored in the memory 302 to implement functions of the intermediary apparatus 30. The communication interface 304 is a physical interface for connecting to the network. The image interface 305 is a physical interface for transmitting image data to the output apparatus 40.

Figure 5:
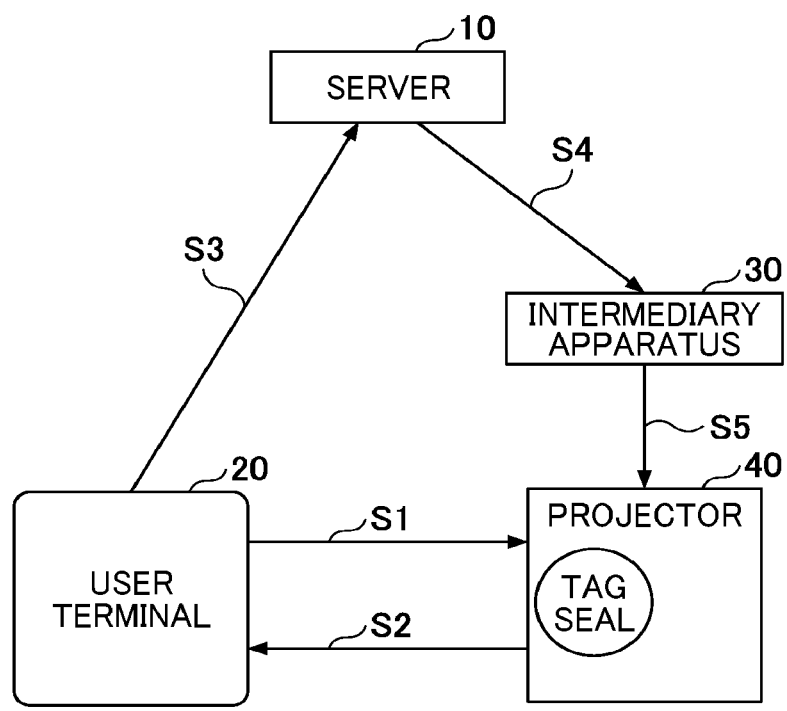
FIG. 5 is an example diagram of a scheme of the information processing system according to the first embodiment.

FIG. 5 is an example diagram of a scheme of the information processing system 1 of the first embodiment. As illustrated in FIG. 5, the output apparatus 40 is attached with, for example, a seal type NFC tag. Hereinafter, the seal type NFC tag is referred to as the "tag seal." The tag seal stores information (hereinafter, "tag information") including a universal resource locator (URL) to be accessed by the user terminal 20 initially (hereinafter, "initial access URL") among one or more URLs for accessing the server 10. The tag information includes the initial access URL assigned with optional information, such as a registration identification (ID). For example, the tag information employs a following format.

https://xxx.yyy.com/?tagid=Tag01

In this tag information format, "ZZZ" portion of "tagid=ZZZ" (i.e., "Tag01" in this example) corresponds to the registration ID. The registration ID represents identification information stored or registered in the server 10. Each one of the tag seals can be assigned with unique registration ID (each tag seal assigned with different registration ID), or the same registration ID can be assigned to a plurality of tag seals. On the other hand, the portion of "https://xxx.yyy.com/" (i.e., initial access URL) can be common to the tag information stored in each of the tag seals used in the user environment E1. Further, a configuration not including the registration ID in the initial access URL can be employed, in which the registration ID may be stored separately from the initial access URL.

When a user places the user terminal 20 near the tag seal attached to the output apparatus 40 (step S1), the short-range wireless communication device 206 of the user terminal 20 reads out and acquires the tag information stored in the tag seal (step S2).

Then, the user terminal 20 accesses the server 10, which is a destination indicated by the initial access URL (e.g., "https://xxx.yyy.com") included in the acquired tag information (step S3). At this stage, the registration ID included in the acquired tag information is also transmitted to the server 10 from the user terminal 20.

The server 10 controls the execution of one or more service operations pre-registered in association with the registration ID. For example, if the concerned service operation is a projection of image data captured by the user terminal 20 using the output apparatus 40, the server 10 acquires, from the user terminal 20, the image data captured by the user terminal 20, and then transmits the image data to the intermediary apparatus 30 associated with the registration ID (step S4). The server 10 further transmits, for example, display data of a screen demanding or prompting uploading of the image data to the user terminal 20, and then the user terminal 20 displays the screen on a display. When a user performs an operation on the screen displayed on the user terminal 20, the server 10 receives the image data captured by the user terminal 20, from the user terminal 20.

When the intermediary apparatus 30 receives the image data from the server 10 (step S4), the intermediary apparatus 30 renders or generates an image based on the image data.

Then, the intermediary apparatus 30 transmits the rendering result to the output apparatus 40 (step S5). Then, the output apparatus 40 projects the rendering result (i.e., image data) on to a screen, such as a wall.

Therefore, the user can use the concerned service operation related to the above described output apparatus (e.g., output apparatus 40) by performing a simple operation, such as obtaining or acquiring the tag information from an external source (e.g., tag seal) external to the user terminal 20. For example, in the above described example case, the concerned service operation can be used by performing the simple operation such as bringing the user terminal 20 to a position close to the tag seal attached or pasted on the output apparatus 40. As described above, the to-be-performed concerned service operation can be identified in accordance with the registration ID. That is, different service operations can be associated with different registration IDs.

Figure 6:
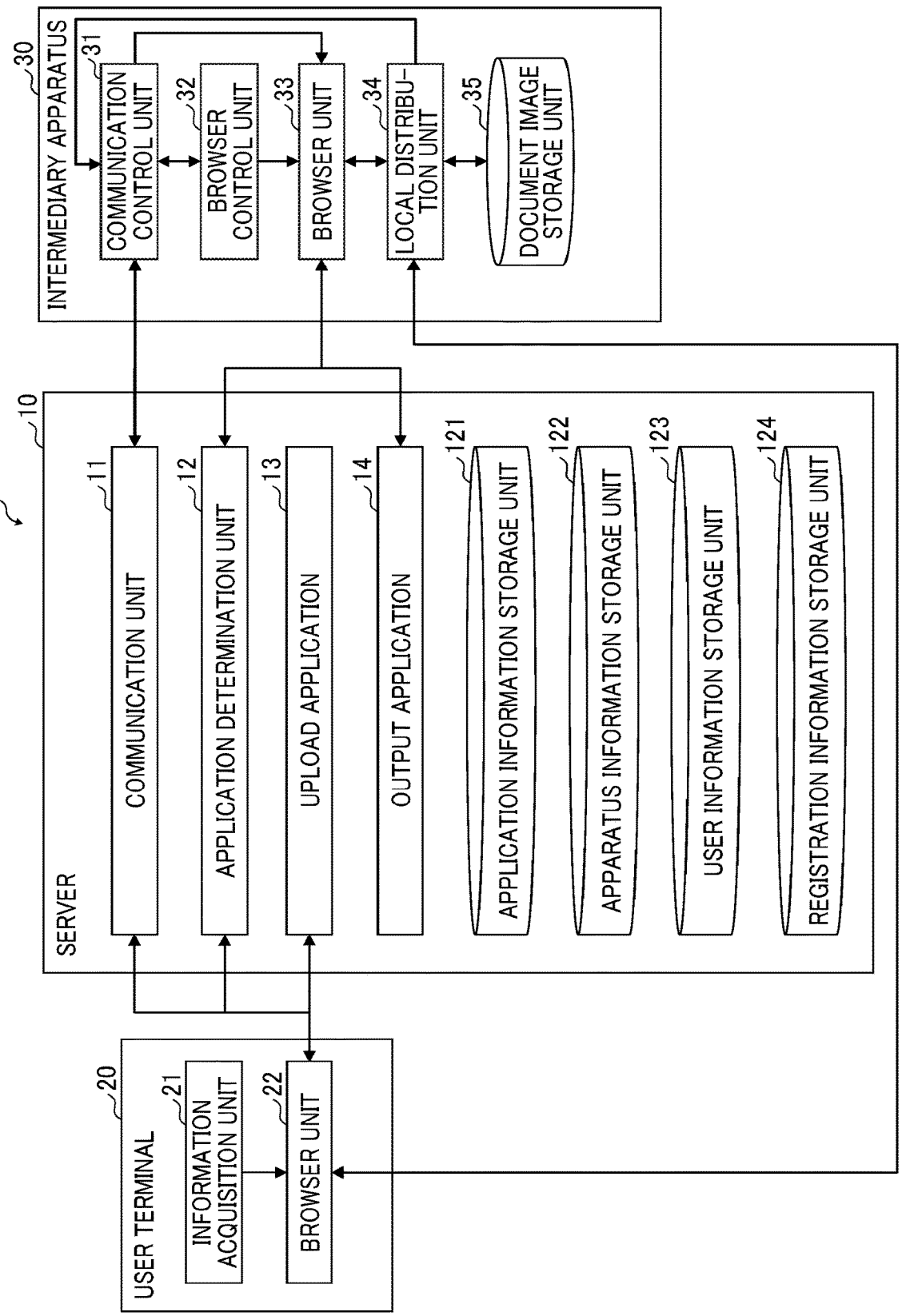
FIG. 6 is an example block diagram of a functional configuration of each apparatus in the information processing system according to the first embodiment.

In order to implement the processing described in FIG. 5, the user terminal 20, the intermediary apparatus 30 and the server 10 employ the functional configuration indicated in FIG. 6.

FIG. 6 is an example block diagram of a functional configuration of each apparatus in the information processing system 1 according to the first embodiment. As indicated in FIG. 6, the user terminal 20 includes, for example, an information acquisition unit 21 and a browser unit 22. These units can be implemented by executing one or more programs installed in the user terminal 20 using the CPU 201.

The information acquisition unit 21 acquires the tag information (e.g., the initial access URL including the registration ID) from the tag seal using the short-range wireless communication device 206, and activates the browser unit 22 using the tag information as input information. The information acquisition unit 21 can be implemented by executing a part of an operating system (OS) of the user terminal 20 by the CPU 201.

The browser unit 22 is, for example, a general web browser, and performs processing according to hypertext markup language (HTML) data and script (e.g., JavaScript (registered trademark)) or the like. The browser unit 22 transmits the registration ID included in the tag information to the application determination unit 12 of the server 10 corresponding to the initial access URL included in the tag information, which is reported or notified as the input information from the information acquisition unit 21.

Further, when the application determination unit 12 transmits a response such as a redirect request to the browser unit 22 in response to the access to the initial access URL, the browser unit 22 accesses a specific application associated with the registration ID in accordance with the redirect request received from the application determination unit 12, among applications installed on the server 10. Then, the browser unit 22 acquires data (e.g., hypertext markup language (HTML) data, script) indicating an execution request of processing to the user terminal 20 from the specific application.

As indicated in FIG. 6, the intermediary apparatus 30 includes, for example, a communication control unit 31, a browser control unit 32, a browser unit 33 and a local distribution unit 34. These units can be implemented by executing one or more programs installed in the intermediary apparatus 30 using the CPU 303. The intermediary apparatus 30 also includes a document image storage unit 35. The document image storage unit 35 can be implemented using, for example, the auxiliary storage device 301 or a storage device in the user environment E1, which is connected to the intermediary apparatus 30 via a network such as LAN.

The communication control unit 31 connects a bi-directional communication path with the communication unit 11 of the server 10 (i.e., establishing a communication session), and functions as an endpoint at the intermediary apparatus 30 on the communication path (communication session). By performing the communication via the communication path (communication session), the state of the intermediary apparatus 30 can be reported or notified to the server 10, and the intermediary apparatus 30 can receive, from the server 10, a notification that image data to be projected using the output apparatus 40 is input to the server 10. In the first embodiment, the intermediary apparatus 30 can receive, from the server 10, a notification that the image data is uploaded to the server 10 from the user terminal 20.

The browser control unit 32 activates the browser unit 33 using, for example, a kiosk mode. The kiosk mode is a mode that restricts the usage of the intermediary apparatus 30 to displaying of web pages alone. The kiosk mode is just one example. Any mode that can display the web pages can be employed.

The browser unit 33 is, for example, a general web browser, and performs processing in accordance with hypertext markup language (HTML) data and script. The browser unit 33 accesses the initial access URL (i.e., the application determination unit 12 of the server 10) in response to the activation. At this stage, the identification information of the browser unit 33 (hereinafter, "browser ID") is assigned to the initial access URL as optional information. Further, when the application determination unit 12 transmits a response such as a redirect request to the browser unit 33 in response to the access to the initial access URL, the browser unit 33 accesses a specific application associated with the browser ID, in accordance with the redirect request received from the application determination unit 12, among applications installed on the server 10. Then, the browser unit 33 acquires data (e.g., HTML data, script) indicating an execution request of processing to the intermediary apparatus 30 from the specific application.

The local distribution unit 34 receives the image data to be input from an input source of the image data with respect to a specific service operation associated with the registration ID, and stores the image data in the document image storage unit 35 (FIG. 6). Further, the local distribution unit 34 reports or notifies an input of the image data to an output destination of the image data for the specific service operation. Further, in response to a request received from the output destination, the local distribution unit 34 obtains or acquires the image data from the document image storage unit 35 (FIG. 6) and transmits the image data to the output destination. In the first embodiment, the input source is a user terminal 20, and the output destination is the intermediary apparatus 30.

As indicated in FIG. 6, the server 10 includes, for example, a communication unit 11, an application determination unit 12, an upload application 13, and an output application 14. These units can be implemented by executing one or more programs installed on the server 10 using the CPU 104. The server 10 further includes an application information storage unit 121, an apparatus information storage unit 122, a user information storage unit 123, and a registration information storage unit 124. Each of these storage units can be implemented by, for example, the auxiliary storage device 102, or a storage device that can be connected to the server 10 via a network.

The communication unit 11 establishes a communication session with the communication control unit 31 of the intermediary apparatus 30, and receives a notification of the state of the intermediary apparatus 30 using a communication via the communication session.

The application determination unit 12 determines or identifies the application corresponding to the initial access URL. In response to access to the initial access URL, the application determination unit 12 refers to the registration information storage unit 124 to determine or identify an application corresponding to the optional information (e.g., registration ID or browser ID) assigned to the initial access URL. Then, the application determination unit 12 transmits a response including a redirect request including a URL of the determined or identified application to an accessing source that has accessed the initial access URL of the server 10, in which the accessing source is, for example, the user terminal 20.

In the first embodiment, the application determination unit 12 determines or identifies a URL of the upload application 13 as the application corresponding to the registration ID for the access from the user terminal 20 used as the input source of the image data. Further, the application determination unit 12 determines or identifies a URL of the output application 14 as an application corresponding to the browser ID for the access from the intermediary apparatus 30 used as the output destination of the image data.

The upload application 13 and the output application 14 are examples of applications installed on the server 10 according to the first embodiment. The upload application 13 is an application for causing the user terminal 20 to upload the image data. Specifically, the upload application 13 transmits HTML data and script to the user terminal 20 to cause the user terminal 20 to upload the image data.

The output application 14 is an application for causing the intermediary apparatus 30 to execute an acquisition (downloading) and outputting of the image data uploaded from the user terminal 20. Specifically, the output application 14 transmits HTML data and script to the intermediary apparatus 30 to cause the intermediary apparatus 30 to acquire and output the image data.

The application information storage unit 121 stores information (e.g., URL) related to each of applications installed on the server 10. In the first embodiment, the application information storage unit 121 stores, for example, information related to the upload application 13 and the output application 14.

The user information storage unit 123 stores identification information of one or more users who are allowed to use the applications installed on the server 10.

The apparatus information storage unit 122 stores information indicating the state of the intermediary apparatus 30 for each of the intermediary apparatuses 30 disposed in the user environment E1.

The registration information storage unit 124 stores identification information of an application used for executing the input processing of image data, identification information of an application used for executing the output processing of image data, and identification information of the browser unit 33 of the intermediary apparatus 30 used as the output destination of the image data, for each of the registration IDs.

Figure 7:
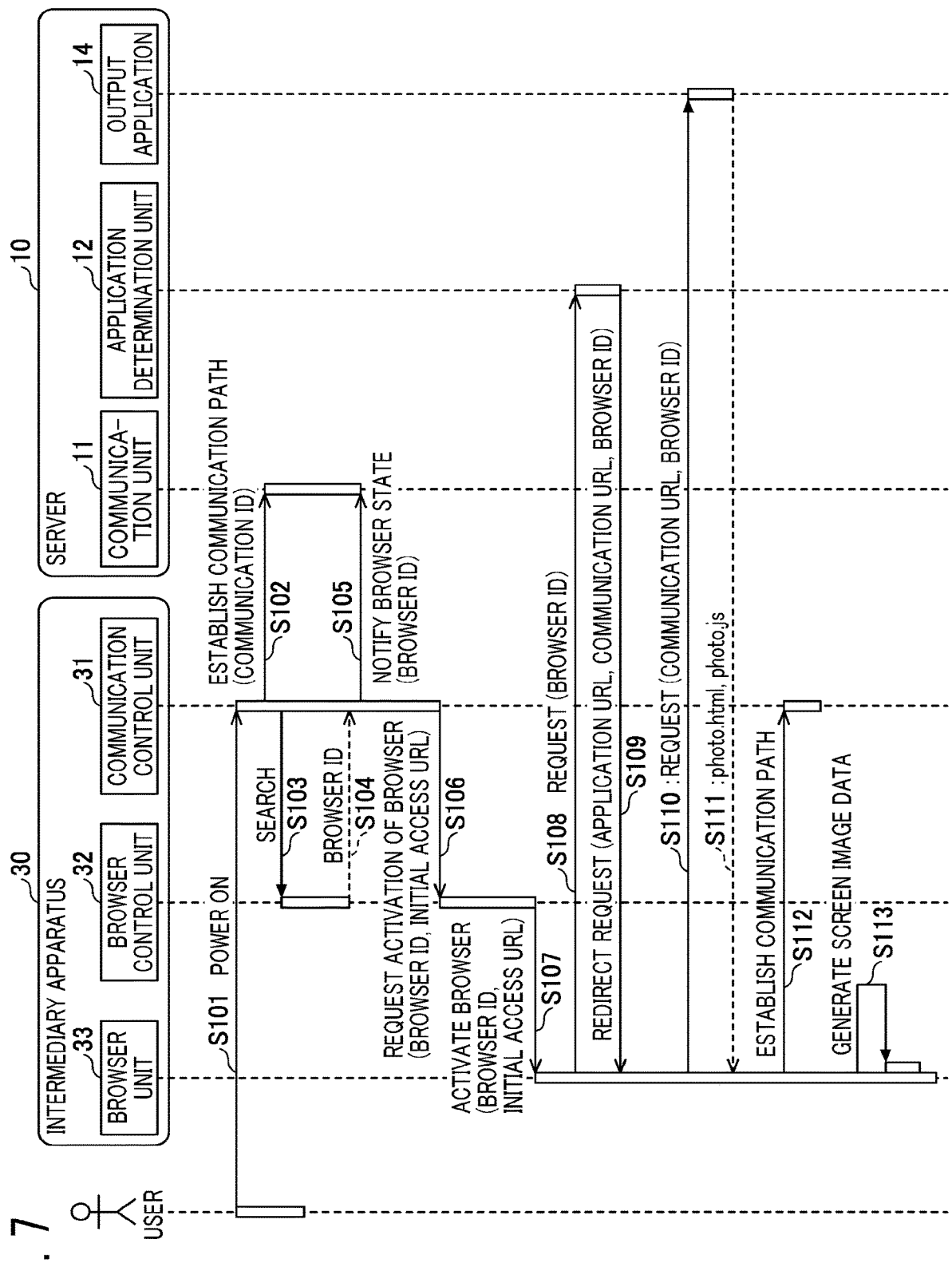
FIG. 7 is an example sequence diagram of processing, which is performed in response to an activation of an intermediary apparatus.

Hereinafter, a description is given of processing performable in the information processing system 1 with reference to FIG. 7. FIG. 7 is an example sequence diagram of processing, which is performed in response to an activation of the intermediary apparatus 30.

When a user turns on the power supply to the intermediary apparatus 30 (step S101), the communication control unit 31 establishes a communication path with the communication unit 11 of the server 10 to receive a request from the communication unit 11 of the server 10 asynchronously (step S102). At this stage, the communication control unit 31 reports or notifies a communication ID, which is the identification information of the communication control unit 31, to the communication unit 11. Then, the communication unit 11 updates the apparatus information storage unit 122 based on the communication ID (hereinafter, "target communication ID") reported or notified from the communication control unit 31.

FIG. 8 is an example of information stored in the apparatus information storage unit 122. As indicated in FIG. 8, the apparatus information storage unit 122 stores, for example, tenant ID, communication ID, address information, state information, browser ID, browser state and distribution source address information in association with each other.

The tenant ID represents identification information of a subscriber (e.g., tenant) having a service-use contract provided by the server 10. For example, the user environment E1 can be one tenant.

The communication ID represents identification information of the communication control unit 31 of each intermediary apparatus 30 disposed in the tenant identified or specified by the tenant ID. If the intermediary apparatus 30 includes only one communication control unit 31, the communication ID can be used as the identification information identifying the intermediary apparatus 30.

The address information represents a local internet protocol (IP) address of the intermediary apparatus 30.

The state information represents information indicating whether or not the communication control unit 31, identified or specified by the communication ID, is connected to the server 10, such as whether the communication control unit 31 has established the communication path with the server 10 ("connected") or not ("not connected").

The browser ID represents identification information of the browser unit 33 corresponding to the communication control unit 31 identified or specified by the communication ID. In the first embodiment, the browser ID represents identification information of the browser unit 33 included in the same intermediary apparatus 30 including the communication control unit 31 identified or specified by the communication ID.

Basically, the browser unit 33 (browser ID) and the output apparatus 40 are corresponded with each other with a condition of one-to-one. For example, the communication ID of "Eg001-01" corresponds to the intermediary apparatus 30a, the browser ID of "BROWSER1" corresponds to the projector 41, and the browser ID of "BROWSER2" corresponds to the display 42. Further, the communication ID of "Eg001-02" corresponds to the intermediary apparatus 30b, and the browser ID of "BROWSER3" corresponds to the electronic information board 43.

The browser state represents information indicating the activation state of the browser unit 33 identified or specified by the browser ID.

The distribution source address information represents information indicating address information (URL) of the local distribution unit 34 used for distributing image data, which is a distribution target to be distributed (input target and output target) for each service operation. In the embodiment, the distribution source address information corresponds to the tenant ID (user environment E1) with a condition of one-to-one.

For example, if the target communication ID reported or notified to the communication unit 11 is "Eg001-01," the state information corresponding to the target communication ID in the apparatus information storage unit 122 is changed to "connected" as indicated in FIG. 8.

Referring again FIG. 7, the communication control unit 31 searches the browser control unit 32 to obtain or acquire the browser ID using, for example, simple network management protocol (SNMP) (step S103).

Then, the communication control unit 31 obtains or acquires the browser ID, which is the identification information of the browser unit 33 to be controlled by of the browser control unit 32, from the searched browser control unit 32 (step S104).

In the first embodiment, the intermediary apparatus 30 includes the communication control unit 31 and the browser control unit 32. In this configuration, the communication control unit 31 included in one intermediary apparatus 30 searches the browser control unit 32 using the simple network management protocol (SNMP) to enable the communication control unit 31 included in one intermediary apparatus 30 to communicate with the browser control unit 32 included in another intermediary apparatus 30 via the same network so that a plurality of the browser control units 32 and the browser units 33 can be used. Therefore, the searching of the browser control unit 32 is not necessarily required, but the acquiring destination (browser control unit 32) that the communication control unit 31 is to acquire the browser ID can be pre-set in advance.

Then, the communication control unit 31 transmits, to the communication unit 11, a notification that the state of the browser unit 33 corresponding to the acquired browser ID (e.g., the browser unit 33 of the intermediary apparatus 30) becomes ready for use by designating the browser ID (hereinafter, "target browser ID") of the browser unit 33 (step S105). In response to receiving the notification from the communication control unit 31, the communication unit 11 updates the apparatus information storage unit 122 (FIG. 8) based on the target browser ID designated in the notification. Specifically, a value of the browser state corresponding to the target browser ID is updated from "power OFF" to "power ON" in the apparatus information storage unit 122.

Then, the communication control unit 31 designates the target browser ID and the initial access URL to request the browser control unit 32 to activate the browser unit 33 identified or specified by the target browser ID (step S106). As described above, the initial access URL corresponds to the URL to be accessed by the browser unit 33 at first, and is pre-set in the browser control unit 32 in advance.

In response to receiving the request from the communication control unit 31 (step S106), the browser control unit 32 activates the browser unit 33 identified or specified by the target browser ID using the kiosk mode (step S107). At this stage, the browser control unit 32 inputs the initial access URL to the browser unit 33.

Then, in response to activating the browser unit 33 using the kiosk mode (step S107), the browser unit 33 transmits an HTTP request to the input initial access URL (step S108). The HTTP request includes the target browser ID.

In response to receiving the HTTP request from the browser unit 33 (step S108), the application determination unit 12 of the server 10 transmits a response (HTTP response) including a redirect request to the browser unit 33 (step S109). The redirect request includes a URL of an application (application URL) associated with the browser ID as a redirect destination. The redirect request further includes a communication URL, and the target browser ID included in the HTTP request, as the notification information to the redirect destination. The communication URL corresponds to the URL of the communication control unit 31.

At this stage, the application determination unit 12 refers to the registration information storage unit 124 (FIG. 9) and the application information storage unit 121 (FIG. 10) to identify or specify a URL of a specific application associated with the target browser ID.

FIG. 9 is an example of information stored in the registration information storage unit 124. As indicated in FIG. 9, the registration information storage unit 124 stores, for example, registration ID, In-application ID, Out-application ID, and browser ID in association with each other.

The In-application ID is an ID of an application (hereinafter, "application ID") that controls the input of image data for a specific service operation corresponding to the registration ID. For example, the In-application ID of "AP_Upload" indicates the application ID of the upload application 13.

The Out-application ID is an application ID of an application that controls the output of image data for a specific service operation corresponding to the registration ID. For example, the Out-application ID of "AP_PhotoShow" indicates the application ID of the output application 14. In this description, the browser ID indicates the browser ID of the browser unit 33 corresponding to the registration ID.

FIG. 10 is an example of information stored in the application information storage unit 121. As indicated in FIG. 10, the application information storage unit 121 stores, for example, application ID, application type, and URL for each application installed on the server 10.

The application type represents a type of an application identified or specified by the application ID based on a relationship with image data. "In" indicates that the application type is an application that controls the input of image data (corresponding to the above described In-application ID). "Out" indicates that the application type is an application that controls the output of image data (corresponding to the above described Out-application ID). The URL corresponds to the URL of the application identified or specified by the application ID.

Therefore, the application determination unit 12 refers to the registration information storage unit 124 (FIG. 9) to identify or specify a specific Out-application ID associated with the target browser ID, and then refers to the application information storage unit 121 (FIG. 10) to identify or specify a URL associated with the specific Out-application ID. In this example case, it is assumed that the target browser ID is "BROWSER1." Then, a URL (hereinafter, output application URL) of the specific application (i.e., output application 14) having the application ID of "AP_PhotoShow" is identified.

Further, the application determination unit 12 automatically generates the communication URL of the communication control unit 31 identified or specified by the target communication ID based on the address information associated with the target browser ID in the apparatus information storage unit 122 (FIG. 8).

Then, referring again to FIG. 7, in accordance with the redirect request (step S109), the browser unit 33 transmits (redirects) an HTTP request to the output application URL used as the redirect destination that is the output application 14 (step S110). The HTTP request includes the communication URL, and the browser ID included in the redirect request.

In response to receiving the HTTP request from the browser unit 33 (step S110), the output application 14 transmits a response including a script of "photo.js" and display data of "photo.html" to the browser unit 33 (step S111), in which the script of "photo.js" is used to cause the browser unit 33 to connect with the communication URL included in the HTTP request, and the display data of "photo.html" is used to cause the browser unit 33 to render a user interface used for outputting image data (e.g., slide show). The script and display data are examples of data indicating an execution request of specific processing to the intermediary apparatus 30. For example, the script can be another type of program, and the display data can be another type of data.

In response to receiving the response from the output application 14 (step S111), the browser unit 33 executes the script of "photo.js" included in the response to establish a communication path with the communication control unit 31 identified by the communication URL (step S112). The communication path is used as a communication path used for transmitting the notification, received by the communication control unit 31 from the server 10, to the browser unit 33. The communication path can use, for example, websocket.

Then, the browser unit 33 generates or renders screen image data (hereinafter, "display screen") on a pre-set region of the memory 103 (e.g., video memory) based on the display data of "photo.html" included in the response (step S113). For example, the display screen is a screen that serves as a frame screen, which is used to set the image data distributed from the server 10. The rendering content (i.e., display screen) generated by the browser unit 33 is output to the output apparatus 40 via an interface such as HDMI (registered trademark), and then the rendering content (i.e., display screen) can be output (projected or displayed) using the output apparatus 40.

Figure 11:
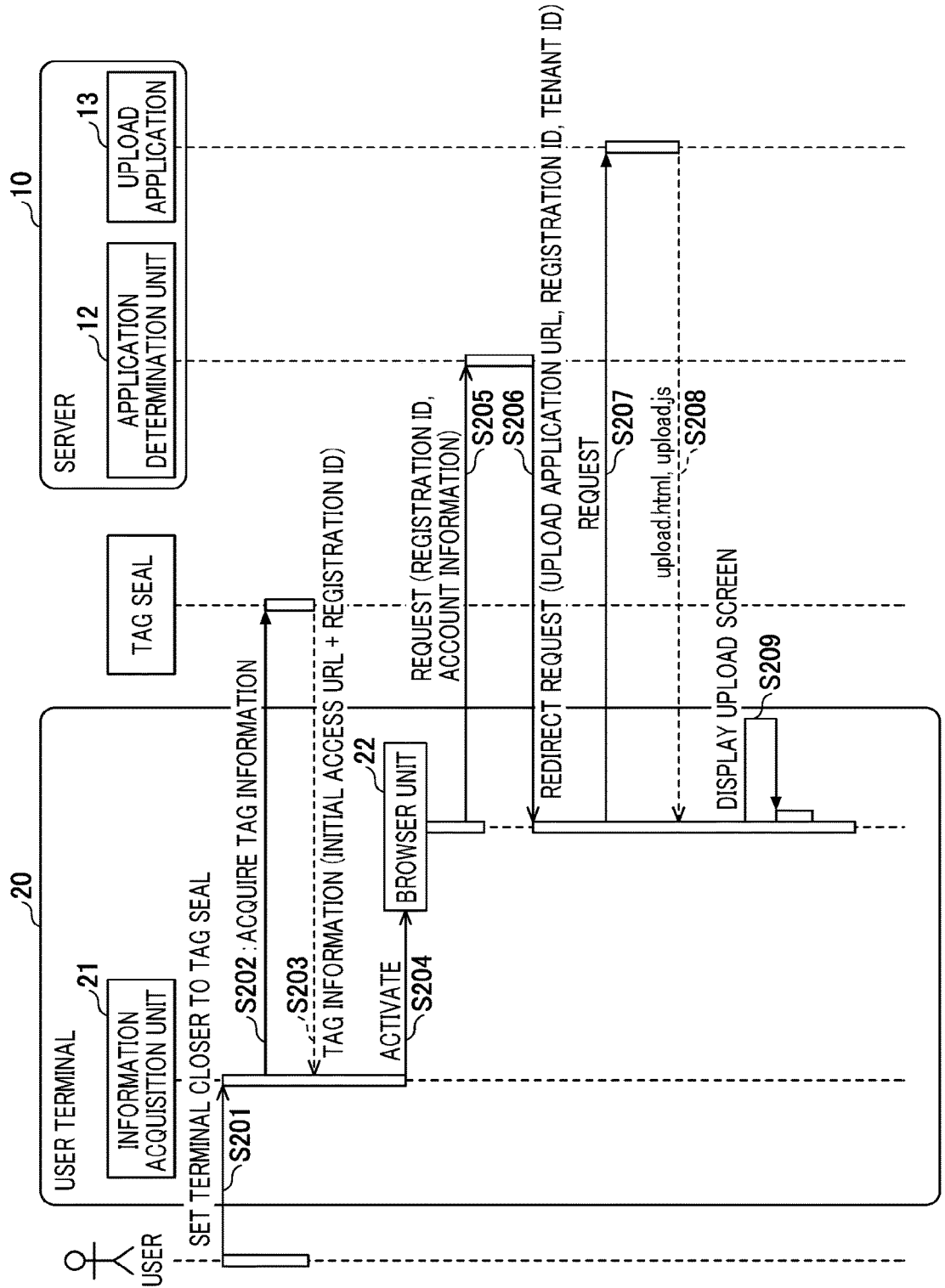
FIG. 11 is an example sequence diagram of processing, which is preformed when a user terminal is placed closer to a tag seal.

FIG. 11 is an example sequence diagram of processing, which is performed when the user terminal 20 is placed closer to the tag seal.

When a user sets or brings the user terminal 20 closer to the tag seal attached to the output apparatus 40, such as placing the user terminal 20 over the output apparatus 40 (step S201), the information acquisition unit 21 acquires the tag information stored in the tag seal via the short-range radio communication using the short-range wireless communication device 206 (steps S202, S203). The tag information includes the initial access URL assigned with the registration ID (hereinafter, "target registration ID") as optional information. In the first embodiment, it is assumed that a value of the target registration ID is "Tag01."

Then, based on a condition that the URL is included in the tag information, the information acquisition unit 21 activates the browser unit 22 using the tag information as input information (step S204).

In response to the activation of the browser unit 22 (step S204), the browser unit 22 automatically transmits an HTTP request to the application determination unit 12 corresponding to the initial access URL included in the tag information as the input information (step S205). The HTTP request includes account information as optional information in addition to the target registration ID. The account information includes, for example, information including identification information identifying a user of the user terminal 20 (hereinafter, "user ID") and the tenant ID (hereinafter, "target tenant ID") identifying the user environment E1 where the user belongs to, or information capable of identifying or specifying the user ID and the target tenant ID. For example, cookie can be used as the account information.

In response to receiving the HTTP request from the browser unit 22 of the user terminal 20 (step S205), the application determination unit 12 of the server 10 authenticates or verifies the account information included in the HTTP request. If the authentication or verification is successful, step S206 and subsequent steps are performed. The authentication is performed, for example, by determining whether or not the account information included in the HTTP request is already registered in the user information storage unit 123 (FIG. 12).

Figures 12, 13:
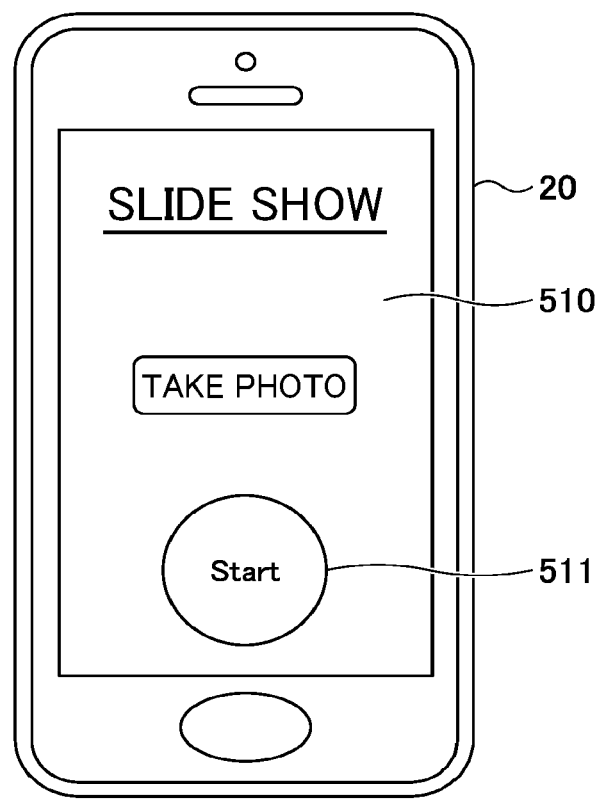
FIG. 12 is an example of information stored in a user information storage unit.
FIG. 13 is an example of display of an upload screen.

FIG. 12 is an example of information stored in the user information storage unit 123. As indicated in FIG. 12, the user information storage unit 123 stores, for example, tenant ID and user ID for each user who is allowed to use one or more applications installed on the server 10.

If the authentication is successful in step S205, the application determination unit 12 transmits a response (HTTP response) including a redirect request to the browser unit 22 (step S206). The redirect request includes a URL of the upload application 13 (hereinafter, "upload application URL") identified or specified by the In-application ID of "AP_Upload" stored in the registration information storage unit 124 (FIG. 9) in association with the target registration ID of "Tag01" as the redirect destination, and the target tenant ID. The upload application URL can be identified or specified by referring to the application information storage unit 121 (FIG. 10).

Referring again to FIG. 11, in accordance with the redirect request received from the application determination unit 12 (step S206), the browser unit 22 transmits (redirects) an HTTP request to the upload application URL used as the redirect destination that is the upload application 13 (step S207).

In response to receiving the HTTP request from the browser unit 22 (step S207), the upload application 13 generates display data of "upload.html" and a script of "upload.js," and transmits a response including the display data of "upload.html" and the script of "upload.js" to the browser unit 22 (step S208), in which the display data of "upload.html" is used as screen image data (hereinafter, "upload screen") used for uploading the image data, and the script of "upload.js" is used to cause the user terminal 20 to execute the uploading of the image data in response to a user operation performed on the "upload screen." The script and display data are examples of data indicating an execution request of the processing to the user terminal 20.

When generating the display data, the upload application 13 determines whether or not the uploading is allowed based on the address information (e.g., interne protocol (IP) address) set for the transmission source of the HTTP request, which is transmitted in step S207. Specifically, if the IP address is given address information (specifically, a value of the IP address corresponds to a given value (global address) set for the network in the user environment E1), the upload application 13 determines that the uploading is allowed, and generates the display data of the upload screen.

On the other hand, if the IP address is not the given address information, specifically, if a value of the IP address does not correspond to the given value set for the network in the user environment E1 (i.e., if the transmission source of the HTTP request transmitted in step S207 is disposed outside the user environment E1), the upload application 13 determines that the uploading is not allowed, and then generates display data of a screen (hereinafter, "upload refusal screen") indicating that the uploading is not allowed, instead of the display data of the upload screen.

The server 10 can be configured to store a global address list set for each user environment E1 in advance. The global address list is referred to a request for transmission to the outside from the inside of the user environment E1, in which the upload application 13 can determine whether the concerned IP address corresponds to the IP address corresponding to the user environment E1 based on the global address list. That is, since the IP address included in the request to be transmitted to the outside from the inside of each user environment E1 is converted from a private address to a global address by a firewall disposed for each user environment E1, the server 10 can recognize the global address corresponding to each tenant ID.

If the uploading of image data is allowed, the upload application 13 refers to the apparatus information storage unit 122 (FIG. 8) to generate a definition of an instruction of upload destination of image data in the script of "upload.js."

Specifically, the upload application 13 generates a script of "upload.js" including an instruction of setting the distribution source address information, stored in the apparatus information storage unit 122 (FIG. 8) in association with the target tenant ID included in the HTTP request transmitted in step S207, as the identification information of the upload destination of the image data.

However, if the distribution source address information is blank as in a case having the tenant ID of "T002" in FIG. 8, the upload application 13 generates the display data of the upload refusal screen. In this case, since the access to the user environment E1 is from outside the user environment E1, the uploading of image data is not allowed.

If the display data of the upload refusal screen is generated, the upload application 13 transmits a response including the display data of the upload refusal screen to the browser unit 22 in step S208 instead of the display data of the upload screen.

In response to receiving the response from the upload application 13 (step S208), the browser unit 22 generates the upload screen based on the display data of "upload.html" and displays the generated upload screen on the display device 211 (step S209).

FIG. 13 is an example of display of an upload screen 510. As indicated in FIG. 13, the upload screen 510 includes, for example, a start button 511. The start button 511 is an operation unit for receiving a start instruction of an image capture operation. When a user selects or presses the start button 511 to perform the image capture operation, the captured image data is displayed on the display device 211.

If the browser unit 22 receives the response including the display data of the upload refusal screen, the browser unit 22 generates an upload refusal screen and displays the upload refusal screen on the display device 211. In this case, the sequence in FIG. 14 is not performed.

Figure 14:
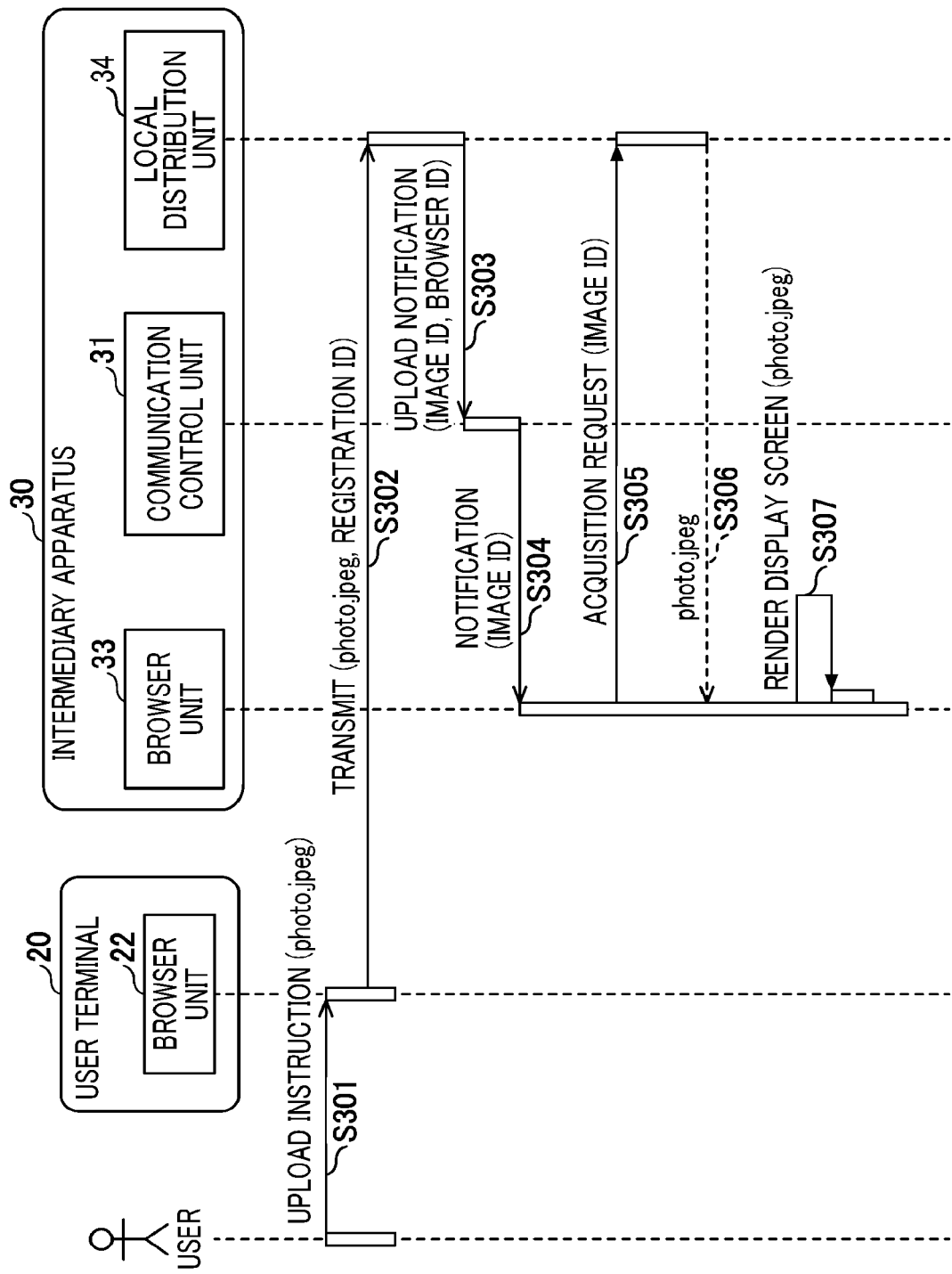
FIG. 14 is an example sequence diagram of distribution processing of image data from a user terminal to an intermediary apparatus according to the first embodiment.

FIG. 14 is an example sequence diagram of distribution processing of image data from the user terminal 20 to the intermediary apparatus 30 according to the first embodiment.

When a user performs a specific operation (e.g., swiping) corresponding to an upload instruction for image data (hereinafter, "target image data") being displayed on the display device 211 of the user terminal 20 (step S301), the browser unit 22 transmits (uploads), to the communication unit 11 of the server 10, the target image data of "photo.jpeg" and the target registration ID based on the definition of the script of "upload.js" (step S302). As this stage, a transmission destination (upload destination) of the target image data is set based on the distribution source address information included in the script of "upload.js."

Specifically, the URL including the distribution source address information following a local loopback address is set as the transmission destination. Therefore, the local distribution unit 34 within the intermediary apparatus 30 is set as the transmission destination. In response to receiving the target image data and the target registration ID, the local distribution unit 34 assigns identification information (hereinafter, "image ID") to the target image data, and stores the target image data in the document image storage unit 35 (FIG. 6) in association with the image ID (hereinafter, "target image ID").

Then, the local distribution unit 34 specifies or identifies the browser ID (target browser ID) stored in the registration information storage unit 124 (FIG. 9) in association with the target registration ID.

Then, the local distribution unit 34 transmits a notification that the image data has been uploaded (hereinafter, "upload notification") to the communication control unit 31 (step S303). The upload notification includes the target image ID and the target browser ID. The upload notification is an example of process execution request for the service operation.

In response to receiving the upload notification from the local distribution unit 34 (step S303), the communication control unit 31 uses the communication path established between the communication control unit 31 and the browser unit 33 identified or specified by the browser ID included in the upload notification (i.e., the communication path is established in step S112 of FIG. 7) to report or notify the target image ID included in the upload notification to the browser unit 33 (step S304). At this stage, the communication control unit 31 also reports or notifies, the browser unit 33, the URL of the local distribution unit 34 used as the transmission source of the upload notification.

In response to receiving the notification from the communication control unit 31 (step S304), the browser unit 33 transmits, to the local distribution unit 34, an acquisition request for acquiring the image data in accordance with the definition of the script of "photo/js" (step S305). The acquisition request includes the target image ID.

In response to receiving the acquisition request from the browser unit 33 (step S305), the local distribution unit 34 transmits, to the browser unit 33, a response including the image data of "photo.jpeg," stored in the document image storage unit 35 (FIG. 6) in association with target image ID included in the acquisition request (step S306).

In response to receiving the image data from the communication unit 11 (step S306), the browser unit 33 renders the image data in a pre-set region of the memory 103 (e.g., video memory) so that the image data is set in the display screen generated in step S113 of FIG. 7 (step S307). Further, the rendering content is transmitted to the output apparatus 40 via the image interface 305 or the communication interface 304 of the intermediary apparatus 30. As a result, the rendering content can be output (e.g., projected or displayed) on a screen (e.g., wall) using the output apparatus 40.

By performing the above described processing, a service operation of outputting the image data using the output apparatus (e.g., output apparatus 40) can be performed each time the user terminal 20 captures the image data. For example, by using the service operation of outputting the image data using the output apparatus disposed at any locations, such as parties, seminars, exhibition halls or the like, the image data captured in these locations can be sequentially displayed on a large display screen.

In the above described configuration, the apparatus connected to the intermediary apparatus 30 is the output apparatus 40, but is not limited thereto. For example, another apparatus, such as digital signage, electronic whiteboard, display, or printer can be connected to the intermediary apparatus 30 instead of the output apparatus 40. In this case, the rendering content of the intermediary apparatus 30 can be displayed on the digital signage, the electronic blackboard, and the display, or can be printed by the printer.

Further, in the above described configuration, the tag seal is attached to the output apparatus 40 associated with the tag seal, but is not limited thereto. For example, the tag seal can be attached to any portion. For example, the tag seal can be attached to any portion in a location (e.g., room) where the output apparatus 40 is located.

As described above as the first embodiment, the user terminal 20 acquires the tag information from the tag seal and transmits the registration ID included in the tag information to the server 10, and then the server 10 determines or identifies the address information (global address) corresponding to the user terminal 20 that transmits the registration ID to the server 10. Then, based on the address information (global address) corresponding to the user terminal 20, the server 10 determines or identifies the transmission destination of image data, input from the user terminal 20 for the service operation associated with the registration ID and to be output using the output apparatus 40, and transmits the information indicating the transmission destination of image data to the user terminal 20. That is, the server 10 can change the transmission destination of image data in accordance with the address information of the user terminal 20. Therefore, the determination of transmission destination of data (e.g., image data), to be output by using the target apparatus, can be flexibility performed.

Specifically, the transmission destination (upload destination) of image data can be a local storage device (e.g., intermediary apparatus 30) disposed in each user environment E1. With this configuration, the occurrence of distribution of image data from the user environment E1 to the outside of the user environment E1 can be prevented.

Further, after the intermediary apparatus 30 establishes a communication session with the server 10, the intermediary apparatus 30 receives, from the server 10 via the communication session, a request for executing the processing of the service operation that is registered in association with the registration ID received from the user terminal 20, and then the intermediary apparatus 30 executes or performs the processing requested by the execution request, and outputs the execution result of the processing to the output apparatus 40. That is, even if the server 10 and the output apparatus 40 are not connected using a direct network configuration, because the intermediary apparatus 30 is interposed between the server 10 and the output apparatus 40, the execution result of the processing, corresponding to the execution request transmitted from the server 10, can be output to the appropriate output apparatus 40 using the intermediary apparatus 30. Therefore, even if the output apparatus 40 does not have the communication function using the communication network, the output apparatus 40 can be controlled indirectly from the server 10 through the communication network. Further, the output apparatus 40 can have the communication function using the communication network, or the output apparatus 40 can have a communication function for communicating with the server 10.

Further, when a user brings or places the user terminal 20 closer to the tag seal, the user can execute pre-set processing associated with the tag seal (i.e., registration ID), using the apparatus (e.g., output apparatus 40) connected to the intermediary apparatus 30. That is, the user does not need to directly operate the output apparatus 40 but can operate the output apparatus 40 indirectly by performing an operation at the user terminal 20, with which operability of the target apparatus, such as the output apparatus 40, can be improved.

Further, the screen displayed on the user terminal 20 can be generated from the display data (e.g., HTML data) distributed from the server 10, in which the screen displayed on the user terminal 20 has lesser dependency to the apparatus or device associated with the tag seal. Therefore, as to the first embodiment, the user can reduce operation workloads of operating various types of user interfaces, such as various operation panels different for various apparatuses or devices, with which the user can use each apparatus or device by performing given operations, which are highly common to a plurality of apparatuses or devices.

Further, by interposing the intermediary apparatus 30 between the server 10 and the target apparatus (e.g., output apparatus 40), even if the target apparatus (e.g., output apparatus 40) does not have a network function, the above described embodiment can be applied to any apparatus having an interface that can transmit image data. Further, if the user wants to switch the output destination of image data from one target apparatus to another target apparatus, the switching of apparatuses can be performed by switching the target apparatus connected to the intermediary apparatus 30 from one target apparatus to another target apparatus, in which there is no need to change the setting information in the server 10.

Further, in the above described first embodiment, the user terminal 20, such as a smart phone installed with programs can be used, and the user terminal 20 is not required to be installed with special applications.

Further, since the intermediary apparatus 30 and the target apparatus (e.g., output apparatus 40) can be connected using an interface for transmitting image data, for example, the settings required for wireless LAN connection via a router or the settings required for wired LAN connection are not required.

Further, as to the first embodiment, the NFC tag is used as an example of the external recording medium storing the tag information, but is not limited thereto. As long as the user terminal 20 can acquire the tag information from an external source (e.g., tag seal, etc.) disposed outside the user terminal 20, any method other than the short-range wireless communication can be employed. For example, a seal printed with the tag information using a printed bar code or two-dimensional code can be used instead of the tag seal. In this case, the user terminal 20 can acquire the tag information using a bar code reader, a two-dimensional code reader, or the digital camera 207. The bar code or the two-dimensional code are not necessarily printed on the seal. For example, the bar code or the two-dimensional code can be displayed on a display of the output apparatus or target apparatus, or can be printed on the output apparatus or any external recording medium other than the seal. The tag seal using the NFC tag described above is just one example, which means the external recording medium other than the seal can include the NFC tag.

Further, the user terminal 20 can be configured to receive acoustic waves or beacons, which are transmitted from a transmission device disposed at the periphery of the output apparatus or target apparatus or inside the output apparatus or target apparatus to acquire the tag information embedded in the received acoustic waves or beacons.

Further, the user terminal 20 can be configured to access the output apparatus or an external apparatus disposed at the periphery of the output apparatus via a network to acquire the tag information.

Further, the user terminal 20 can be configured to acquire the tag information from any external recording medium (e.g., seal) printed with an image. In this case, the user terminal 20 can acquire the image using the digital camera 207 and extract the tag information from a background pattern embedded in the image. Known techniques can be used to embed information (e.g., background pattern) in the image, and known techniques can be used to extract information from the background pattern.

Second Embodiment

Hereinafter, a description is given of a second embodiment with reference to FIG. 15. The second embodiment describes different aspects with respect to the first embodiment. Therefore, the points same as in the first embodiment may not be specifically described.

Figure 15:
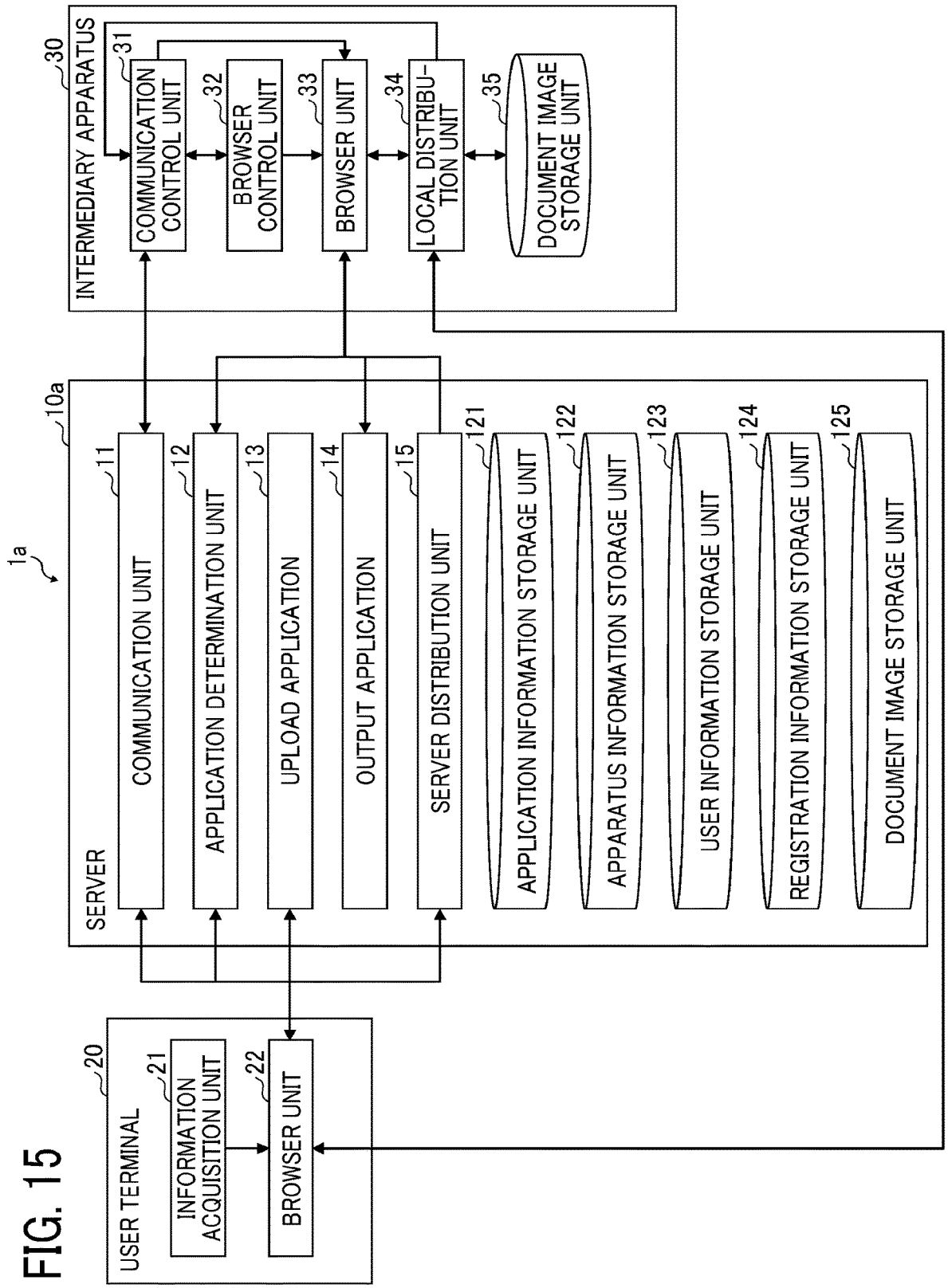
FIG. 15 is an example block diagram of a functional configuration of each apparatus in an information processing system according to a second embodiment.

FIG. 15 is an example block diagram of a functional configuration of each apparatus in an information processing system 1a according to the second embodiment. In FIG. 15, the same units as those in FIG. 6 are denoted by the same reference numerals, and the description thereof will be omitted. The information processing system 1a includes, for example, a server 10a, the user terminal 20, and the intermediary apparatuses 30.

In FIG. 15, the server 10a further includes a server distribution unit 15. The server distribution unit 15 can be implemented by executing one or more programs installed on the server 10a using the CPU 104. The server 10a further includes a document image storage unit 125. The document image storage unit 125 can be implemented by, for example, the auxiliary storage device 102, or a storage device that can be connected to the server 10a via a network.

In the server 10a, the server distribution unit 15 implements the same function as the local distribution unit 34. The document image storage unit 125 is a storage unit used by the server distribution unit 15 to store image data. That is, in the second embodiment, the distribution of image data can be also executed by the server 10a.

Hereinafter, a description is given of processing performable in the information processing system 1.

In the second embodiment, a part of the processing content performed by the upload application 13 in response to the HTTP request in step S207 of FIG. 11 is different from the first embodiment. Specifically, in the second embodiment, the upload application 13 performs the same processing as the first embodiment until step S207, in which it is determined whether the uploading is allowed or not based on the IP address set for the transmission source included in the HTTP request.

If the uploading is allowed and the value of the distribution source address information stored in the apparatus information storage unit 122 (FIG. 8) associated with the target tenant ID is blank, the upload application 13 generates a script of "upload.js" by including the URL of the server distribution unit 15 as the identification information (distribution source address information) identifying the upload destination of image data. That is, in the second embodiment, the uploading of image data from the user terminal 20 disposed outside the user environment E1 can be also allowed. In the second embodiment, the script of "upload.js" is generated so that image data uploaded from the user terminal 20 disposed outside the user environment E1 is stored in the server 10a.

Figure 16:
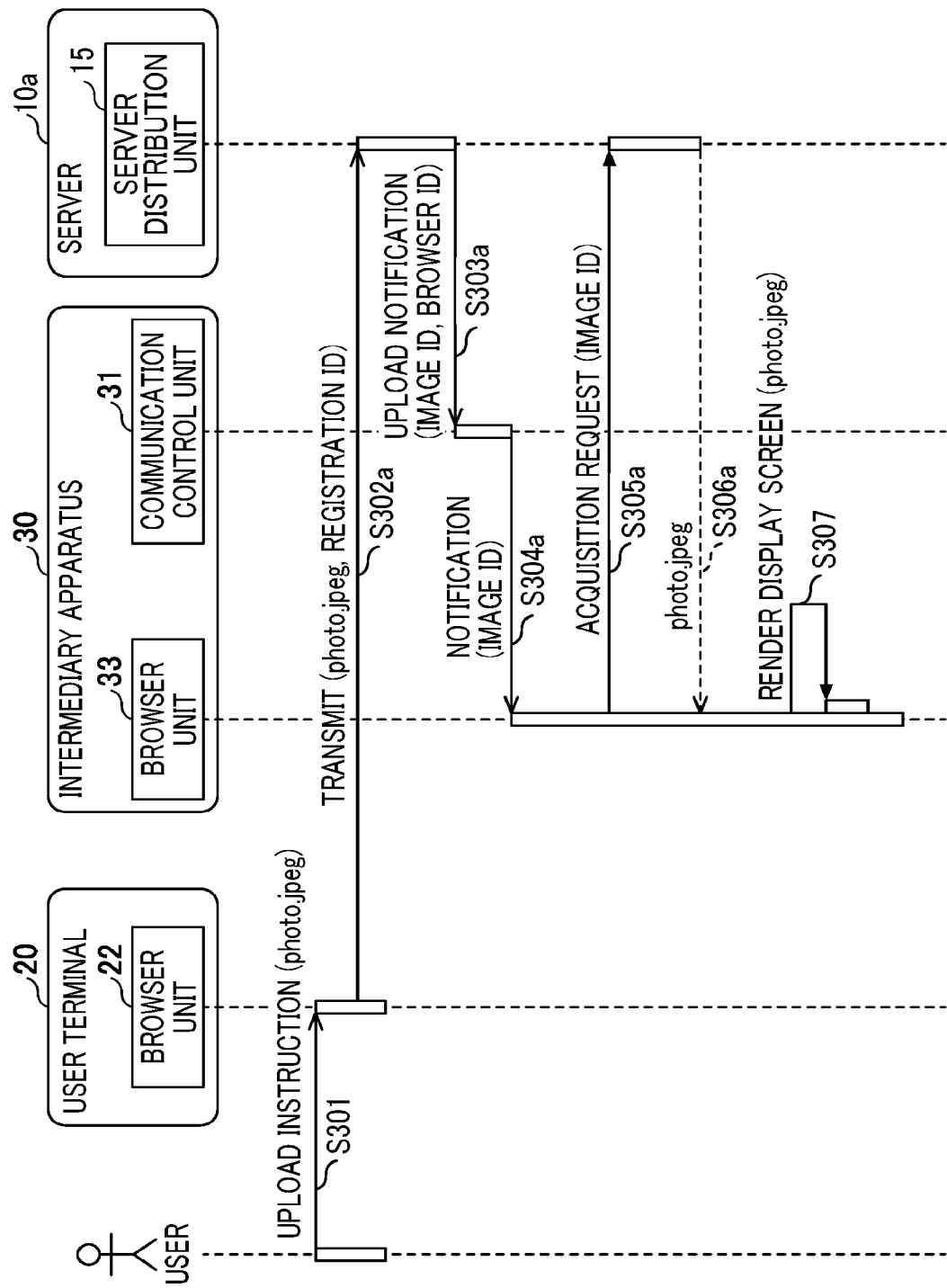
FIG. 16 is an example sequence diagram of distribution processing of image data from a user terminal to an intermediary apparatus according to the second first embodiment.

When the script of "upload.js" is generated in this manner in the second embodiment, the sequence in FIG. 16 is performed instead of the sequence in FIG. 14.

FIG. 16 is an example sequence diagram of distribution processing of image data from the user terminal 20 to the intermediary apparatus 30 according to the second embodiment. In FIG. 16, the same steps as those in FIG. 14 are denoted by the same step numbers, and the description thereof will be omitted. Steps S302, S303, S304, S305 and S306 in FIG. 14 are replaced with S302a, S303a, S304a, S305a and S306a in FIG. 16, respectively.

In step S302a, the browser unit 22 transmits (uploads) the target image data of "photojpeg" and the target registration ID to the URL of the server distribution unit 15, which is included as the distribution source address information in the script of "upload.js" configuring the display data of the upload screen. That is, the target image data of "photo.jpeg" and the target registration ID are transmitted to the server distribution unit 15 from the browser unit 22 of the user terminal 20. In response to receiving the target image data and the target registration ID from the browser unit 22 of the user terminal 20, the server distribution unit 15 assigns an image ID to the target image data, and stores the target image data in the document image storage unit 125 in association with the image ID (hereinafter, "target image ID").

Then, the server distribution unit 15 specifies or identifies the browser ID (target browser ID) stored in the registration information storage unit 124 (FIG. 9) in association with the target registration ID.

Then, the server distribution unit 15 uses the communication path, established in step S102 in FIG. 7, between the communication unit 11 and the communication control unit 31, identified or specified by the communication ID (target communication ID) stored in the apparatus information storage unit 122 (FIG. 8) in association with the target browser ID, to transmit a notification that the image data has been uploaded (hereinafter, "upload notification") to the communication control unit 31 (step S303a). The upload notification includes the target image ID and the target browser ID. The upload notification is an example of process execution request for the service operation.

In response to receiving the upload notification from the server distribution unit 15 of the server 10a (step S303a), the communication control unit 31 uses the communication path, established in step S112 in FIG. 7, between the communication control unit 31 and the browser unit 33 identified or specified by the browser ID included in the upload notification, to report or notify the target image ID included in the upload notification to the browser unit 33 (step S304a). At this stage, the communication control unit 31 reports or notifies the browser unit 33, the URL of the server distribution unit 15 based on a condition that the transmission source of the upload notification is the communication unit 11 of the server 10a.

In response to receiving the notification from the communication control unit 31 (step S304a), the browser unit 33 transmits, to the server distribution unit 15, an acquisition request for acquiring the image data in accordance with the definition of the script of "photo.js" (step S305a). The acquisition request includes the target image ID.

In response to receiving the acquisition request from the browser unit 33 (step S305a), the server distribution unit 15 transmits, to the browser unit 33, a response including the image data of "photo.jpeg" stored in the document image storage unit 125 in association with target image ID included in the acquisition request (step S306a).

As to the above described second embodiment, based on the settings stored in the apparatus information storage unit 122 (FIG. 8), the transmission destination (upload destination) of image data input by the user terminal 20 can be changed to any one of a local apparatus (e.g., intermediary apparatus 30) disposed in the user environment E1 or an apparatus (e.g., server 10) disposed outside the user environment E1. With this configuration, for example, the user who is concerned about the distribution of image data to the outside of the user environment E1 selects the local apparatus (e.g., intermediary apparatus 30) disposed in the user environment E1, and the user who wants to use greater storage capacity in a cloud or the like selects an apparatus (e.g., server 10), disposed outside the user environment E1, with which the determination of the transmission destination of data can be flexibility performed.

In conventional technologies using cloud servers, image data are assumed to be controlled or managed on the cloud servers. Therefore, users have concerns about transmitting confidential data, such as image data of highly confidential documents, to sites external of organizations (e.g., companies), using the cloud servers.

As to the above described one or more embodiments, the determination of the transmission destination of data, to be output by using the target apparatus, can be flexibility performed, with which users can flexibility determine the transmission destination in view of confidentiality level of the data.

Further, as to the above described one or more embodiments, each of the server 10, the intermediary apparatus 30, the output apparatus 40, and the user terminal 20 can be constructed using a single computer, or each unit (function or means) can be divided and then constructed using a plurality of computers arbitrarily assigned with divided units.

Each of the functions of the one or more embodiments described above may be implemented by one or more processing circuits or circuitry. Each of the functions of the described embodiments may be implemented by one or more processing circuits or circuitry. Processing circuitry includes a programmed processor, as a processor includes circuitry. A processing circuit also includes devices such as an application specific simultaneous circuit (ASIC), DSP (digital signal processor), FPGA (field programmable gate array) and conventional circuit components arranged to perform the recited functions.

In the above described one or more embodiments, the server 10 is an example of information processing apparatus, and the upload application 13 is an example of an instruction unit.

Each of the embodiments described above is presented as an example, and it is not intended to limit the scope of the present disclosure. Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above.

The present disclosure can be implemented in any convenient form, for example using dedicated hardware, or a mixture of dedicated hardware and software. The present disclosure may be implemented as computer software implemented by one or more networked processing apparatuses. The network can comprise any conventional terrestrial or wireless communications network, such as the Internet. The processing apparatuses can compromise any suitably programmed apparatuses such as a general-purpose computer, personal digital assistant, mobile telephone (such as a WAP or 3G-compliant phone) and so on. Since the present disclosure can be implemented as software, each and every aspect of the present disclosure thus encompasses computer software implementable on a programmable device. The computer software can be provided to the programmable device using any storage medium for storing processor readable code such as a floppy disk, hard disk, CD ROM, magnetic tape device or solid-state memory device. The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cashe memory of the CPU, and the RAM may function as a physical memory or a primary memory of the apparatus, while the HDD may function as a secondary memory of the apparatus.

What is claimed is:

1. An information processing apparatus, communicable with an intermediary apparatus, which is communicable with a target apparatus different from the intermediary apparatus, the information processing apparatus comprising:
   circuitry configured to receive, from a terminal device communicable with the information processing apparatus, particular identification information acquired by the terminal device from an external source associated with the target apparatus;

determine whether image data is allowed to be uploaded from the terminal device based on address information identifying the terminal device;

when determining that the image data is allowed to be uploaded, automatically determine, without human intervention, a transmission destination of the image data to be uploaded from the terminal device, the transmission destination being different from the target apparatus and the image data being related to a service operation determined from the particular identification information, the determination of the transmission destination being based on distribution source information stored in a memory of the information processing apparatus, and based on the address information identifying the terminal device that transmitted the particular identification information to the information processing apparatus, the distribution source information identifying a distribution source that, after the image data is uploaded to the transmission destination, outputs the image data to the target apparatus via the intermediary apparatus for the service operation; and when determining that the image data is allowed to be uploaded, transmit, to the terminal device, information indicating the determined transmission destination of the image data.

2. The information processing apparatus according to claim 1, wherein the circuitry is further configured to determine one of the information processing apparatus and the intermediary apparatus as the transmission destination of the image data.

3. The information processing apparatus according to claim 1, wherein when the address information of the terminal device does not match given address information representing a user network, the circuitry is further configured to determine that uploading the image data is not allowed and not transmit the particular information indicating the transmission destination of the image data.

4. The information processing apparatus according to claim 1, wherein when the address information of the terminal device does not match given address information representing a user network, the circuitry is further configured to determine the information processing apparatus as the transmission destination.

5. The information processing apparatus of claim 1, wherein the circuitry is further configured to determine the transmission destination based on an IP address of the terminal device.

6. The information processing apparatus of claim 1, wherein the circuitry is further configured to determine whether the image data is allowed to be uploaded based on an address list stored in the memory and the address information identifying the terminal device.

7. The information processing apparatus of claim 1, wherein the circuitry is further configured to determine the transmission destination based on the distribution source information, which is stored in the memory in association with tenant information, and based on the address information identifying the terminal device that transmitted the particular identification information to the information processing apparatus.

8. The information processing apparatus of claim 1, wherein the distribution source is different from the terminal device.

9. An information processing system, comprising:
an intermediary apparatus communicable with a target apparatus different from the intermediary apparatus; and
an information processing apparatus communicable with the intermediary apparatus,
wherein the information processing apparatus includes first circuitry configured to
receive, from a terminal device communicable with the information processing apparatus, particular identification information acquired by the terminal device from an external source associated with the target apparatus;
determine whether image data is allowed to be uploaded from the terminal device based on address information identifying the terminal device;
when determining that the image data is allowed to be uploaded, automatically determine, without human intervention, a transmission destination of the image data to be uploaded from the terminal device, the transmission destination being different from the target apparatus and the image data being related to a service operation determined from the particular identification information, the determination of the transmission apparatus being based on distribution source information stored in a memory of the information processing apparatus, and based on the address information identifying the terminal device that transmitted the identification information to the information processing apparatus, the distribution source information identifying a distribution source that, after the image data is uploaded to the transmission destination, outputs the image data to the target apparatus via the intermediary apparatus for the service operation; and
when determining that the image data is allowed to be uploaded, transmit, to the terminal device, information indicating the determined transmission destination of the image data,
wherein the intermediary apparatus includes second circuitry configured to instruct the target apparatus to output the image data, after the image data is received, based on the determined information indicating the transmission destination.

10. The information processing system of claim 9, wherein the external source is a tag seal attached to the target apparatus, and the particular identification information is acquired by the terminal device when the terminal device is physically adjacent to the target apparatus.

11. A method of processing information using an intermediary apparatus communicable with a target apparatus different from the intermediary apparatus, and an information processing apparatus communicable with the intermediary apparatus, the method comprising:
receiving, from a terminal device communicable with the information processing apparatus, particular identification information acquired by the terminal device from an external source associated with the target apparatus;
determining whether image data is allowed to be uploaded from the terminal device based on address information identifying the terminal device;

when determining that the image data is allowed to be uploaded, automatically determining, without human intervention, a transmission destination of the image data to be uploaded from the terminal device, the transmission destination being different from the target apparatus and the image data being related to a service operation determined from the particular identification information, the determination of the transmission destination being based on distribution source information stored in a memory of the information processing apparatus, and based on the address information identifying the terminal device that transmitted the particular identification information to the information processing apparatus, the distribution source information identifying a distribution source that, after the image data is uploaded to the transmission destination, outputs the image data to the target apparatus via the intermediary apparatus for the service operation; and when determining that the image data is allowed to be uploaded, transmitting, to the terminal device, information indicating the determined transmission destination of the image data to the terminal device.

12. The method according to claim 11,
wherein the determining step comprises determining one of the information processing apparatus and the intermediary apparatus as the transmission destination of the image data.

13. The method according to claim 11,
wherein when the address information of the terminal device does not match given address information representing a user network, information indicating the transmission destination of the image data in not transmitted.

14. The method according to claim 11,
wherein when the address information of the terminal device does not match given address information representing a user network, the determining step comprises determining the information processing apparatus as the transmission destination.

* * * * *